W. J. CARTWRIGHT.
ROLLER BEARING.
APPLICATION FILED FEB. 9, 1909.
1,015,273.
Patented Jan. 16, 1912.
2 SHEETS—SHEET 1.
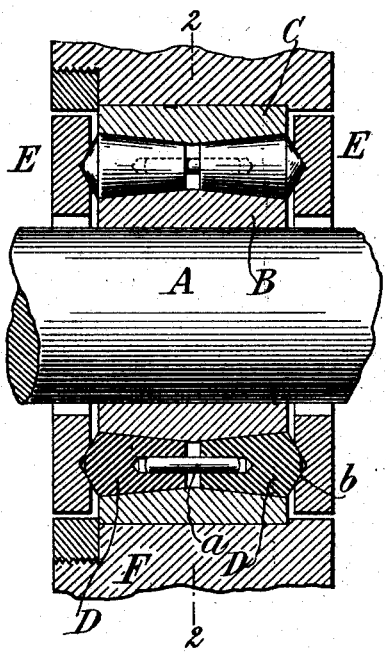
FIG. 1.
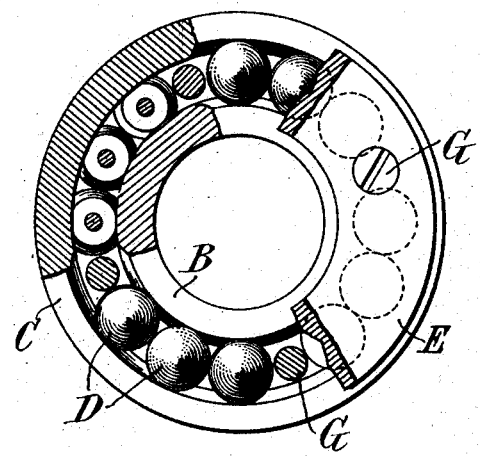
FIG. 2.
FIG. 3.
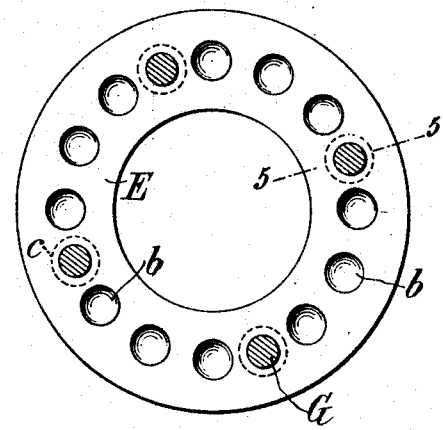
FIG. 5.
FIG. 6.
FIG. 4.
WITNESSES:
INVENTOR:
William J. Cartwright,
By Attorneys.

W. J. CARTWRIGHT.
ROLLER BEARING.
APPLICATION FILED FEB. 9, 1909.

1,015,273.

Patented Jan. 16, 1912.
2 SHEETS—SHEET 2.

WITNESSES:
Fred White
Rene Bruine

INVENTOR:
William J. Cartwright,
By Attorneys,

UNITED STATES PATENT OFFICE.

WILLIAM J. CARTWRIGHT, OF NEW YORK, N. Y.

ROLLER-BEARING.

1,015,273. Specification of Letters Patent. Patented Jan. 16, 1912.

Application filed February 9, 1909. Serial No. 476,941.

*To all whom it may concern:*

Be it known that I, WILLIAM J. CARTWRIGHT, a citizen of the United States, residing in the borough of Manhattan, city, county, and State of New York, have invented certain new and useful Improvements in Roller-Bearings, of which the following is a specification.

This invention relates to roller bearings applicable to shafts, axles or hubs; and its object is to provide such a bearing which shall be capable of adjustment for taking up looseness or lost motion such as may result from wear.

The accompanying drawings show several embodiments of the invention, applicable under different conditions.

Figure 7:
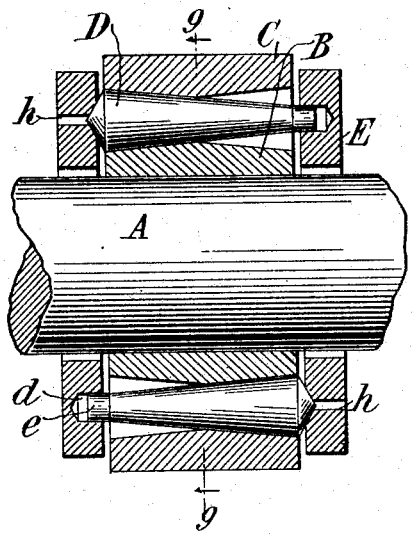
Figure 8:
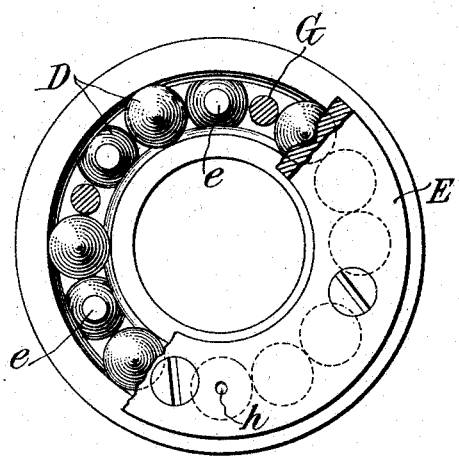
Figure 10:
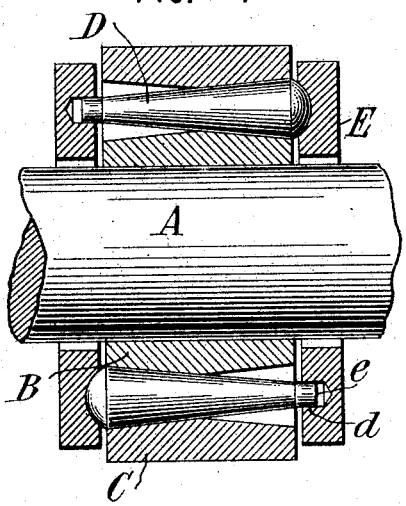
Figure 9:
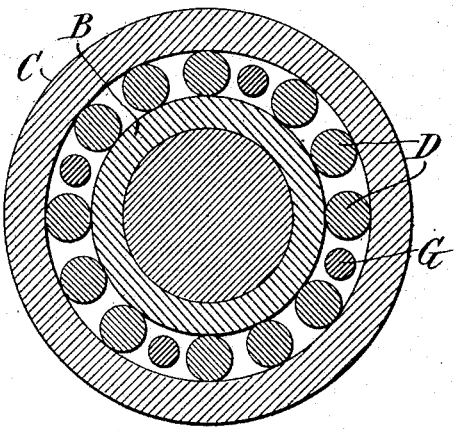

Figures 1 to 5 inclusive show one embodiment, of which Fig. 6 illustrates a slight modification. Fig. 1 is a diametrical section; Fig. 2 is an end elevation of the bearing with one of the guide rings partly broken away and with a part of the bearing in midsection on the line 2—2 in Fig. 1; Fig. 3 shows the inner face of one of the guide rings with its fastening posts in section; Fig. 4 is an elevation of a pair of rollers; Fig. 5 is a transverse section on the line 5—5 in Fig. 3; Fig. 6 is a fragmentary diametrical section in the same plane as Fig. 1; Figs. 7, 8 and 9 show another embodiment of the invention, of which Fig. 10 illustrates a slight modification; Fig. 7 is a diametrical section, corresponding to Fig. 1. Fig. 8 is an end elevation of the bearing, the guide ring being partly broken away; Fig. 9 is a transverse midsection on the line 9—9 in Fig. 7; Fig. 10 is a diametrical section answering to Fig. 7.

In the several drawings, A designates the shaft or axle, B a sleeve or ring encircling the shaft or axle, C another sleeve or ring encircling the ring B, D D the traction rollers between the rings B and C, and E E guide rings engaging the rollers.

In Fig. 1 F designates a portion of the bearing block or pillow in the case of a revolving shaft; or it may designate a portion of the hub of a wheel turning upon a fixed axle.

The shaft A and its ring B may revolve within a fixed bearing F and fixed ring C; or A may be a nonrotative axle and F may be a revolving hub, in which case the ring C revolves around the nonrotating ring B. In either case the rings B and C are traction rings, against and between which roll the rollers D D. These rollers are tapered or slightly coned, and the traction surfaces of the rings B and C are tapered or coned to the same angle, so that the respective traction surfaces of the rings and rollers make an accurate fit and transmit the thrust or pressure uniformly from the one traction ring through the rollers to the other traction ring. The rollers are movable or adjustable with reference to the traction rings in such manner as to take up looseness or wear. The rollers are kept in alinement and at their proper relative spacing by means of the guide rings E E, which suitably engage them. These rings are connected by pins or posts G G which preserve them in correct relation to one another, thus forming what is known as a "cage."

The general nature of the invention being thus understood, I will proceed to describe the several embodiments thereof separately.

Referring first to Figs. 1 to 6, the sleeves or traction rings B and C are each oppositely coned, and receive between them pairs of rollers D D, each roller consisting of a frustum of a cone. The two rollers are spaced somewhat apart to afford room for adjustment. The two rollers of one pair are shown separately in Fig. 4. They are held in alinement by means of an axial pin $a$, which makes a loose working fit with axial holes bored into the respective rollers. The larger or outer ends of the rollers are engaged by the guide rings E E, being either made conical on their ends as shown in Figs. 1 and 4, and entering conical recesses $b\ b$ in the rings; or being made rounded as shown in Fig. 6 and entering rounded recesses in the rings. Fig. 6 also shows a modification of the centering pin $a$, it being formed integrally with one roller and entering a bore in the other. The guide rings E E are connected at intervals to form the cage, by a suitable number of pins or posts G G, four being shown. The relative adjustment of the rollers and traction rings is in this construction effected by moving the rollers in axial direction, so that the two rollers of each pair mutually approach or recede. By reason of their taper the pressure transmitted through them tends to cause them to recede from each other, and consequently presses them outwardly against the guide rings; hence these rings are made adjustable toward or from one another, in order through them to adjust the rollers. For this purpose the connecting pins G G are in this construction utilized as the adjusting means, being made as screws the heads of which engage one ring, while their threaded ends (see Fig. 5) engage the other ring and are fastened by a lock or jam-nut c. This nut is for compactness sunk into a socket in the ring, and is formed with a nick for engagement by a screw-driver or wrench. Thus by releasing the nuts any lost motion or wear can be taken up by turning the screws G G to thereby draw the rings E E closer together and force the rollers D D of the respective pairs to approach one another.

The construction shown in Figs. 1 to 6 is adapted to a bearing carrying a heavy load or side thrust, since it utilizes the full length of each of the rollers for the transmission of the weight or stress. The construction shown in Figs. 7 to 10 is designed for bearings which are subject to a light load or stress. This construction is simpler, in that a single roller is used in place of each of the pairs of rollers in the first described construction.

In Figs. 7 to 9 the traction rings are or may be exactly like those of Figs. 1 to 6. In place however of each pair of rollers shown in Fig. 4, a single conical roller is used, of the shape shown in Fig. 7 or 10. These rollers thus make tractive contact with the traction rings for only one-half of the width of the latter, that is, from the middle thereof to one end only. Hence it is necessary, in order to distribute the traction and avoid an end thrust in one direction, to divide the rollers into two series, with their apexes pointing in contrary directions. It is preferable to alternate the rollers, so that the odd-numbered ones point in one direction and the even-numbered ones in the opposite direction. To illustrate this the sections in Figs. 7 and 10 are cut at the top through a roller of one series and at the bottom through a roller of the other series. The pressure or stress transversely of the main axis of rotation thus tends to cause each of the rollers to travel in the direction of its larger end, or toward the base of the cone; so that the rollers of the respective series press against the guide rings E E which receive their larger ends. These rings are formed with sockets d d to receive journals e e formed on the smaller ends of their respective rollers, in order to maintain the rollers with their axes parallel to the main axis, and to one another, and to keep the rollers properly spaced apart. These recesses d should be deep enough to allow for the relative adjustment of the guide rings. This adjustment is accomplished by the same screw-pins G G as in the first described construction.

By reason of the opposite coning of the rollers any end thrust, in the case of such a bearing as is shown in Figs. 1 to 10, is taken up through the engagement of the tapering rollers with the coned surfaces of the traction rings, by making provision to receive the end-thrust of the rollers themselves. In the construction shown the end-thrust of the rollers by forcing their larger ends against one of the guide-rings is taken up through such ring or through the cage. The engagement of the rollers with such ring is essentially a rolling engagement, since the rollers in propelling the guide-ring make contact with it on only their advancing sides, thereby reducing the surface in contact. In the case of rollers which are coned on their larger ends, the apex of the coned end is made to avoid bearing contact, either by removing the apex, as shown at g in Fig. 4, or by forming the ring with an oil-hole of sufficient diameter, as shown at h in Fig. 7, so that the point or apex of the cone has no bearing in the ring, and hence can not hold the roller centered in the socket or bearing recess in the ring, it being desirable that the rollers should be free to take a slightly eccentric position in these recesses. The ring B is conveniently made distinct from the shaft or axle A, but as these parts are fixed together they may be considered as essentially one part.

What I claim is:—

1. A roller bearing comprising oppositely-tapered rollers, a traction ring having oppositely conical surfaces against which said rollers roll, and guide rings connected together and engaging the rollers at their opposite ends, said rollers having at their larger ends a thrust engagement with such rings.

2. A roller bearing comprising oppositely tapered rollers arranged upon parallel axes, traction rings having oppositely coned surfaces against which said rollers roll, the rollers of opposite taper being independent of each other, and guide rings connected together and engaging the ends of the rollers and receiving the longitudinal thrust thereof.

3. A roller bearing comprising oppositely tapered rollers arranged in pairs, the two rollers of each pair being upon a common axis, and being movable longitudinally independently of one another, traction rings having conical surfaces against which said rollers roll, and guide rings connected together and engaging the outer ends of the pairs of rollers.

4. A roller bearing comprising oppositely tapered rollers arranged in pairs, the two rollers of each pair being upon a common axis, and being movable longitudinally independently of one another, guiding means loosely engaging said rollers to keep them in axial alinement, traction rings having conical surfaces against which said rollers roll, and guide rings connected together and engaging the outer ends of the pairs of rollers.

5. A roller bearing comprising oppositely tapered rollers arranged in pairs upon a common axis with their smaller ends approaching and their larger ends remote from one another, and independently movable longitudinally, traction rings having oppositely coned surfaces against which said rollers roll, and guide rings connected together and engaging the outer ends of the pairs of rollers and receiving the outward thrust thereof.

6. A roller bearing comprising oppositely tapered rollers, traction rings having conical surfaces against which said rollers roll, guide rings connected together and engaging the rollers at their opposite ends, and means for adjusting the distance apart of the respective guide rings whereby to adjust the rollers and take up wear.

In witness whereof, I have hereunto signed my name in the presence of two subscribing witnesses.

WM. J. CARTWRIGHT.

Witnesses:
ARTHUR C. FRASER,
FRED WHITE.